Oct. 3, 1933.  F. S. DELLENBAUGH, JR  1,929,057
APPARATUS FOR OBTAINING DIRECT CURRENT FROM ALTERNATING CURRENT
Original Filed June 17, 1925
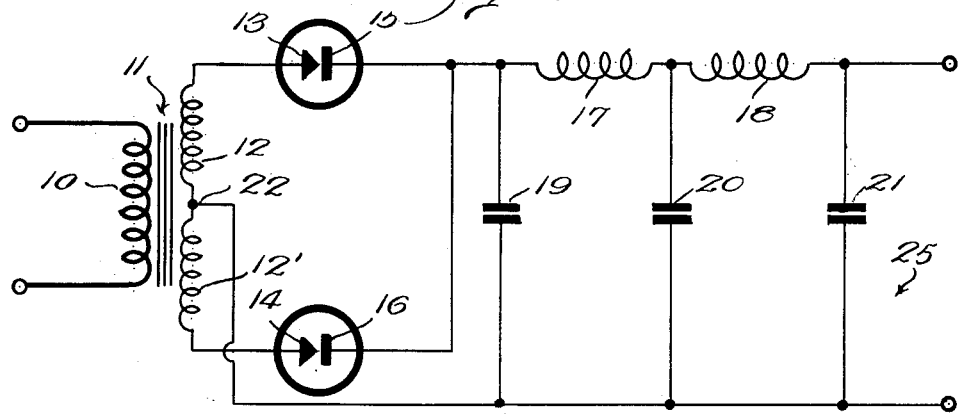
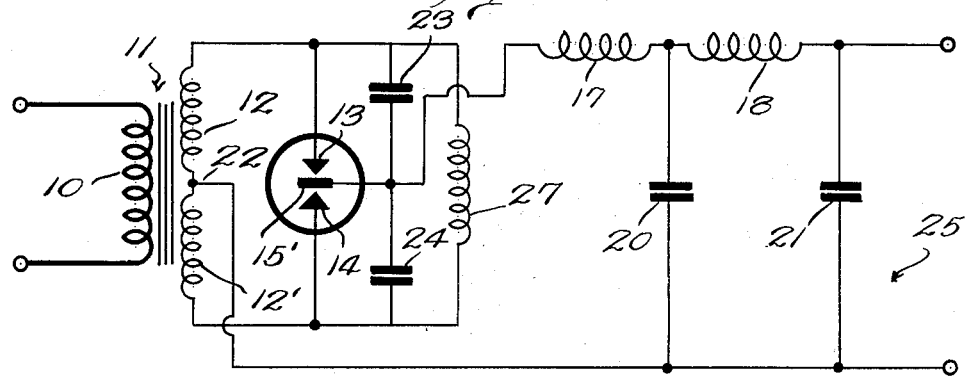
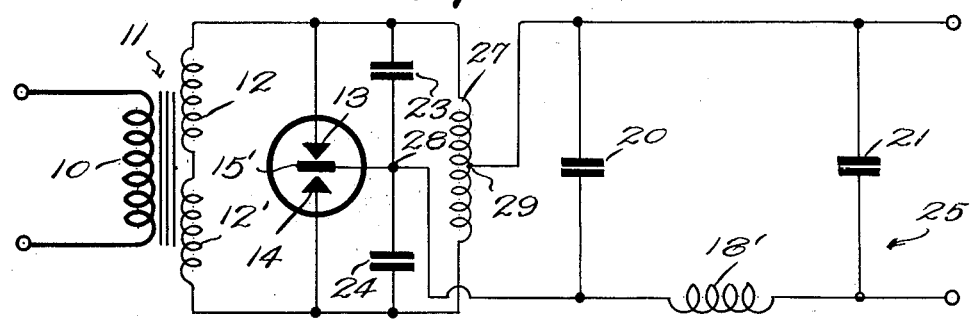
Inventor
Frederick S. Dellenbaugh, Jr
by Dufont Hamilton
Attorney Patented Oct. 3, 1933

1,929,057

UNITED STATES PATENT OFFICE 1,929,057

APPARATUS FOR OBTAINING DIRECT CURRENT FROM ALTERNATING CURRENT

Frederick S. Dellenbaugh, Jr., Brookline, Mass.

Application June 17, 1925. Serial No. 37,659
Renewed August 15, 1931

4 Claims. (Cl. 175—363)

In the operation of rectifiers of the usual type, such as those that depend for their action upon electronic emission, conduction by ionization, electrolitic action and the like, sudden surges of current are sometimes created which react on the various elements of the system and produce variations in the intensity of the rectified current. In the case of thermionic rectifiers, some current will pass whenever the anode is positive, but with rectifiers operating on the ionization and gaseous conduction principle, it is usually necessary to overcome the cathode drop before current will pass when the anode is positive. As soon as the voltage has been built up to the rectifier break-down point, the rectifier will suddenly become conducting and will pass current of relatively high intensity, such intensity being limited chiefly by the external resistances of the system, until the rectifier voltage has fallen to a value below the cathode drop towards the end of the half cycle, whereupon the rectifier will suddenly cease passing current. These two current surges created, respectively, when the rectifier begins to operate and when it ceases to operate, are of instantaneously far greater intensity than the average current delivered. If energy is not available to satisfy the rectifier characteristics, there result sudden variations in the distribution of voltage and current which may create oscillations which are especially undesirable when the rectifier is used in connection with a radio receiving set.

I have discovered that these surges and oscillations can be prevented and the rectifying system maintained in steady operation by employing means for absorbing energy delivered by the alternating current source during the rise of voltage to the rectifier break-down point and discharging the same through said rectifier after said point has been reached and the rectifier becomes conducting.

It is therefore the object of my invention, generically expressed, to provide an apparatus for reducing the variations in the direct current produced by rectifying systems from alternating current, and special objects of my invention are to so locate such energy-absorbing means that it will replace one of the elements of the filter or current-smoothing circuit, to provide means associated with said energy-absorbing means in such manner as to reduce the current drawn from the alternating source which of course permits the use of a smaller transformer, and otherwise to improve and simplify said systems and increase the efficiency thereof in the manner hereinafter more fully set forth.

With the foregoing objects in view, my invention comprises an alternating current source and a rectifying system of any suitable type, such for example, as a mercury vapor arc, or any of the well known types operating by electronic emission, ionization and gaseous conduction, or electrolitic action, two serially-connected inductances, which may be the secondaries of a transformer, associated with said source and with the rectifying system, and two condensers each having one terminal connected to a different one of said inductances and to a different one of the like elements of the rectifying system; or, each connected across a different one of said inductances and each having a terminal connected to a different one of the like elements of the rectifying system. It is to be understood of course that my invention contemplates the use of two separate rectifiers as well as a single rectifier having two anodes and one cathode, or vice versa, constructed and arranged to rectify successive half cycles of opposite polarities.

My invention comprises also the employment of an inductance in shunt to the energy-storing condensers aforesaid to produce a parallel-branch circuit approximately resonant to the frequency of the impressed voltage for the purpose of reducing the amount of current drawn from the alternating current source and permitting the use of a smaller transformer between the rectifier system and the alternating current source. The energy-storing condensers may be so designed as to eliminate one of the condensers connected across the filter circuit, and in the case of the parallel resonant circuit aforesaid, it is preferable to so arrange matters that one of the inductances of said filter circuit may be suppressed, whereby, in both cases, the system is simplified and its cost reduced without impairing its efficiency.

Other objects of my invention and the means for attaining the same will hereinafter appear in the detailed description of the specific embodiments of my invention selected for illustration, and the novel features thereof will be set forth in the appended claims.

In the drawing which accompanies and forms a part of this specification and which is to be considered as illustrative of certain embodiments of my invention rather than restrictive—

Figure 1 is a diagram of one of the old and well known types of rectifying systems;

Fig. 2 is a modification showing a rectifying system having an inductance connected across the energy-absorbing condensers to form a parallel-resonant circuit;

Fig. 3 is a diagram showing a modification of the system shown in Fig. 2.

In Fig. 1 which represents an old and well known rectifying system, the primary 10 of the transformer 11 is connected to a source of alternating current and the secondary consisting of two serially-connected coils 12, 12', are connected, respectively, to the anodes 13, 14 of a rectifier, the cathodes 15, 16 of which are connected to one terminal of a two-section filter or current-smoothing circuit comprising the serially-connected inductances 17, 18 and the parallel connected condensers 19, 20, 21, the other terminal of said circuit being connected to the point 22 intermediate the ends of the secondaries 12, 12'. The operation of this system is well known and requires no explanation herein.

In the use of such a rectifying system with radio receiving sets, frying noises are heard which appear to have definite frequency characteristics due to variations in the voltage and current distribution, which variations I have ascertained can be reduced and practically eliminated by connecting the condensers 23, 24 from the outside terminals of the transformer secondary across the elements 13 and 14 of the rectifier, the said condensers each having a terminal connected to each end of the inductance 27, which, in the present instance, is a transformer secondary, and to a different one of the like elements 13, 14, in the present instance, the anodes, of the rectifying system, and their other terminals connected to the cathode 15'.

In addition to the elimination of the current and voltage variations and the resulting noises above referred to, the said condensers 23, 24, if sufficiently large, will permit the elimination of the condenser 19 without appreciably changing the operation of the system.

It is to be understood that while my invention is particularly applicable to rectifiers employing the principle of ionization and gaseous conduction, nevertheless it is not limited thereto inasmuch as the operation of rectifiers of the other types hereinbefore mentioned will also be improved by the addition of the circuits herein set forth, although for somewhat different reasons.

The following explanation of the operation as at present understood by me is based on the assumption that the rectifier 13, 14, 15' is operating on the ionization and gaseous conduction principle. When the output end 25 of the complete system is connected to a load, the voltage produced by the secondary of the transformer will be impressed from the center connection 22 through the load and smoothing circuit across the elements of the rectifier. Upon one side a positive voltage will be impressed upon the anode 13 and will continue to rise until it reaches a value sufficient to overcome the cathode drop and break down the rectifier, whereupon conduction is started through that side of the circuit. If the condenser 23 were not present, the sudden surge of current which the rectifier 13, 15' would allow to pass, would virtually short-circuit the winding 12 and greatly reduce the voltage across the same which produces two effects, viz., (1) the voltage may be so greatly reduced that current will cease to pass across the rectifier, whereupon said voltage will immediately rise again, producing a second surge of current, this process being repeated and creating oscillations having a frequency determined by the electromagnetic constants of the circuit and a duration controlled largely by the rectifier characteristics. (2) As above pointed out, the rectifier will become suddenly conducting as soon as the break-down point has been reached and the cathode drop overcome, and will pass current of relatively great intensity until the voltage falls below the value of the cathode drop toward the end of the half cycle.

If, however, the condenser 23 be connected as shown, energy will be stored in said condenser while the voltage is building up to the break-down point, and will be discharged across the rectifier as soon as the latter begins to conduct, whereby said system is maintained in steady operation, the amplitude of the currents passed when the potential reaches the break-down point being greatly reduced, and the successive oscillations above described are prevented.

It is to be understood of course that the variations in current and voltage distribution, result both from the current surges created when the cathode drop has been overcome, and also from the successive oscillations above mentioned.

Another effect may be present, namely, the sudden surge upon the breakdown of the rectifier may produce impact excitation of the various parts of the system, and create oscillations therein of a period and duration determined by the characteristics of the particular circuit used. In this case also the condensers 23, 24 will reduce these oscillations to a minimum since the energy required for the surge will be delivered by the condenser and not by the transformer winding.

In the system shown in Fig. 2 the inductance 27 is connected to the outside terminals of the condensers 23, 24 and the condenser 19 is omitted, the condensers 23, 24 being of such size as to perform the function of said condenser 19 as aforesaid. Inasmuch as the condensers 23, 24 are connected in series directly across the transformer secondary 12, 12', they will draw considerable current and therefore require a transformer of larger windings than would be necessary for the operation of the rectifier system without said condensers. However, by employing the inductance 27 of the proper value, a parallel-branch circuit approximately resonant to the frequency of the impressed voltage is provided which delivers only sufficient current to supply the losses in the circuit, while said condensers will store the energy for the smoothing of the rectified current, and they also eliminate oscillations, maintain the system in steady operation, and considerably reduce the excess current drawn from the transformer, therefore permitting the use of a much smaller transformer.

Since the condensers 23, 24 interact with the rectifier as well as with the inductance 27, the conditions are not identical with those of true resonance. Thus when current is passing from the anode 13 to the cathode 15', the condenser 23 is short-circuited and the period of said parallel-branch circuit is increased, and similarly when current passes from the anode 14 to the cathode 15', the condenser 24 is short-circuited with the same result. It will therefore be understood that said parallel resonant circuit is only approximately resonant to the frequency of the impressed voltage, and its constants can best be determined empirically.

The system shown in Fig. 2 involves an additional piece of apparatus, and accordingly the same has been simplified as illustrated in Fig. 3 in which the inductance 17 has been omitted, the inductance 27 performing the function thereof.

In this case one terminal of the output circuit is connected to a point 28 intermediate the inner terminals of the condensers 23, 24 instead of the point 22 at the center of the secondary 12, 12', and the other terminal thereof is connected at the center 29 of the inductance 27. The advantage of this arrangement is that the inductance 27 performs two functions, viz., first, the function above set forth in the description of Fig. 2, and second, the function of the inductance 17 of the filter circuit which may be omitted in whole or in part.

It will be noted that the condenser 19 is not necessarily used in the system shown in Fig. 3, its function being performed as above set forth in connection with the other figures by the condensers 23, 24. The system shown in Fig. 3 represents considerable economy in apparatus since the condensers 23, 24 and the inductance 27 both perform double functions, and therefore do not add materially to the apparatus necessary for the successful operation of the complete rectifier circuit.

Furthermore, I have ascertained that the condenser 20 may be omitted and by proper adjustment of the values of the other units, satisfactory operation will be obtained.

While I have described the application of my invention to a particular transformer, rectifier, and smoothing circuit combination, it will be apparent that it may also be of utility in obtaining constant-potential direct current from any variable source, and, more particularly, from such sources as involve sudden surges or discontinuities in the supply of power.

Having thus described illustrative embodiments of my invention and means whereby my improved method may be practiced, without however limiting said invention thereto, what I claim and desire to secure by Letters Patent is:—

1. A system for obtaining direct current from alternating current, comprising in combination an alternating current source, a full wave rectifier, two serially-connected inductances associated with said source and with said rectifying system, two condensers each having one terminal connected to a different one of said inductances and to a different one of the like poles of said rectifier, an inductance connected in parallel with said condensers and forming therewith a parallel-branch circuit approximately resonant to the frequency of the impressed voltage, and an output circuit suitably connected to the said system.

2. A system for obtaining direct current from alternating current, comprising in combination an alternating current source, a full wave rectifier, two serially-connected inductances associated with said source and with said rectifier, two condensers each having one terminal connected to a different one of said inductances and to a different one of the like poles of said rectifier, an inductance connected in parallel with said condensers and forming therewith a parallel-branch circuit approximately resonant to the frequency of the impressed voltage, and an output circuit having its terminals connected, respectively, to a point intermediate the outer ends of said serially-connected inductances and to a point intermediate the inner terminals of said condensers.

3. A system for obtaining direct current from alternating current comprising, in combination, an alternating current source, a full-wave rectifier connected to said source, said rectifier having two terminals of one polarity and one terminal of opposite polarity, two condensers each having one side connected directly to different ones of said two terminals of one polarity, the other side of each condenser being connected directly to said one terminal of opposite polarity, an additional independent circuit including an inductance connected directly across said two terminals of one polarity, and in parallel with said source, and an output circuit suitably connected to said system.

4. A system for obtaining direct current from alternating current comprising, in combination, an alternating current source, a full-wave rectifier connected to said source, said rectifier having two terminals of one polarity and one terminal of opposite polarity, two condensers each having one side connected to different ones of said two terminals of one polarity, the other side of each condenser being connected to said one terminal of opposite polarity, a circuit including an inductance connected directly across said two terminals of one polarity, said condensers and inductance comprising a circuit which is approximately resonant to the frequency of the impressed voltage, and an output circuit suitably connected to said system.

FREDERICK S. DELLENBAUGH, Jr.